(12) United States Patent
Gish et al.

(10) Patent No.: US 7,389,233 B1
(45) Date of Patent: Jun. 17, 2008

(54) SELF-ORGANIZING SPEECH RECOGNITION FOR INFORMATION EXTRACTION

(75) Inventors: Herbert Gish, Newton, MA (US); William R. Belfield, Boylston, MA (US)

(73) Assignees: Verizon Corporate Services Group Inc., Basking Ridge, NJ (US); BBN Technologies Corp., Cambridge, MA (US)

( * ) Notice: Subject to any disclaimer, the term of this patent is extended or adjusted under 35 U.S.C. 154(b) by 727 days.

(21) Appl. No.: 10/922,721

(22) Filed: Aug. 20, 2004

Related U.S. Application Data

(60) Provisional application No. 60/499,506, filed on Sep. 2, 2003.

(51) Int. Cl.
*G10L 15/00* (2006.01)
(52) U.S. Cl. .................. 704/270; 704/8; 704/275
(58) Field of Classification Search ........... 704/270, 704/275, 8
See application file for complete search history.

(56) References Cited

U.S. PATENT DOCUMENTS 6,052,657 A * 4/2000 Yamron et al. ............ 704/9
6,185,531 B1 * 2/2001 Schwartz et al. .......... 704/256.1
6,735,563 B1 * 5/2004 Bi ............................. 704/241

OTHER PUBLICATIONS

Herbert Gish et al.: "A Segmental Speech Model With Applications to Word Spotting," ICASSP 93, vol. 2, pp. 447-450.
Herbert Gish et al: "Parametric Trajectory Models for Speech Recognition," ICSLP, 1996, pp. 466-469.
Jordan R. Cohen: "Segmenting speech using dynamic programming," *J. Acoust. Soc. Am.* 69(5), May 1981, pp. 1430-1438.

* cited by examiner

*Primary Examiner*—Daniel D Abebe

(57) ABSTRACT

A system is provided that trains a speech processing device to recognize any spoken language. The speech processing device is trained by receiving a group of speech frames (302). The group of speech frames is grouped into a group of segments (304). A model of each of the segments is created (306) and the segments are compared (308). The segments are grouped into clusters based on comparisons of the segments (310). A model for each of the clusters is built (312). The built cluster models enable the labeling of segments from speech in the language. Labeled segments (i.e., recognizer output) may be used to train topic classifiers. Speech topics may be classified on the basis of the generated labeled segments.

40 Claims, 7 Drawing Sheets

US 7,389,233 B1

SELF-ORGANIZING SPEECH RECOGNITION FOR INFORMATION EXTRACTION

RELATED APPLICATIONS

This application claims priority under 35 U.S.C. § 119 based on U.S. Provisional Application Ser. No. 60/499,506, entitled "SELF ORGANIZING SPEECH RECOGNIZER," inventors, Herbert Gish, James Donald Van Sciver, Regina Rosales Hain, and William Belfield, filed on Sep. 2, 2003, the disclosure of which is incorporated herein by reference.

GOVERNMENT CONTRACT

The U.S. Government has a paid-up license in this invention and the right in limited circumstances to require the patent owner to license others on reasonable terms as provided for by the terms of Contract No. F30602-01-C-0086 awarded by the Air Force Research Laboratory, Rome, N.Y.

TECHNICAL FIELD

Systems and methods consistent with the principles of the invention relate generally to speech recognition and, more particularly, to recognition of speech without any prior information with respect to a language used.

BACKGROUND OF THE INVENTION

In order to extract information from speech there has been the need to build speech recognizers for a particular language by building models for the basic sound units of the language, phonemes, and also the words of the language. In the case of a phoneme recognition system, speech data that has been transcribed into phonemes is required. In order to construct a recognizer that produces words, speech needs to be transcribed into the words of the language. Along with the word transcriptions, a word recognizer requires a dictionary that spells words in terms of sequences of phonemes of the language in order to build the recognizer. In those cases where transcriptions and dictionaries are not available, it is not possible to employ conventional recognition methods for the purposes of information extraction.

Conventional recognition methods need not only speech transcriptions from the language in question but may also need transcriptions from the particular domain of interest (e.g., land-line, cell phone, broadcast, regional dialect). Also, use of conventional methods are not possible if the language in question does not have a written form.

SUMMARY OF THE INVENTION

In a first aspect, a machine-implemented method for using a speech processing device is provided. In the method, a speech processing device is trained to recognize speech units of any language.

In a second aspect, an apparatus is provided. The apparatus includes a memory having a group of instructions and a processor configured to execute the group of instructions to train the apparatus to recognize speech of any language.

In a third aspect, a machine-readable medium including a group of instructions for controlling at least one processor to perform a method of processing speech is provided. The method includes training a speech processing device to recognize speech of any language.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Figure 1:
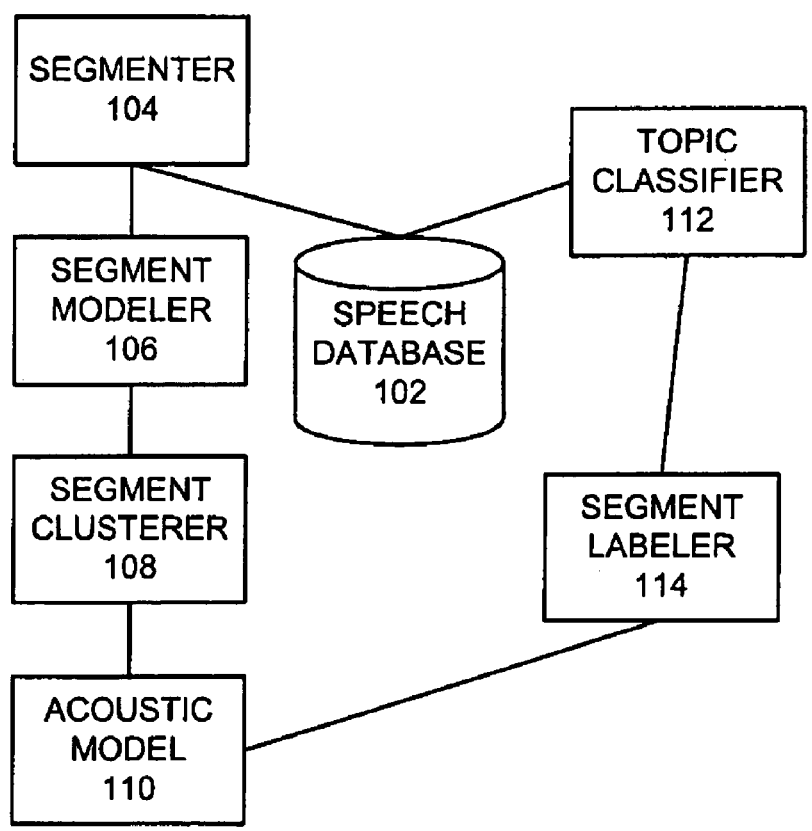
FIG. 1 illustrates a functional block diagram of a speech processing device consistent with principles of the invention.

FIG. 1 illustrates an exemplary speech processing device 100. Speech processing device 100 may include a speech database 102, a segmenter 104, a segment modeler 106, a segment clusterer 108, an acoustic model 110, a topic classifier 112 and a segment labeler 114.

Speech database 102 may include speech training segments as well as recorded speech upon which speech recognition is to be performed. The speech training segments may be from a domain of interest, based on the application. For example, if one is using speech processing device 100 to process speech from radio broadcasts, then the training segments may be speech from radio broadcasts.

Segmenter 104 may analyze waveforms of speech, including speech frames (i.e., portions of speech of a specified duration, such as, for example, 10 millisecond portions of speech) from speech database 102. Segmenter 104 may group the speech frames into segments (groupings of contiguous speech frames) based on a well-known method of finding spectral discontinuities by analyzing spectral band energy of the speech frames. Segmenter 104 may group the speech frames into segments by any one of a number of well-known methods including, for example, methods of analyzing cepstral features of the speech frames.

Segment modeler 106 may create a mathematical model for each segment, as described below with respect to act 306 of FIG. 3.

Segment clusterer 108 may compare the segments and group similar segments into clusters, as described below with respect to acts 308-310 of FIG. 3 and FIG. 4.

Acoustic model 110 may be created from the clusters. In an implementation consistent with the principles of the invention, acoustic model 110 may be implemented as a Gaussian mixture model (GMM), which is well-known in the art. Each cluster may initially be represented by a term of the GMM.

After training of speech processing device 100, speech processing device 100 may be used to process speech by identifying segments in the speech and creating a mathematical model of each of the segments. Segment labeler 114 may create an output having tokens or labels indicating clusters having a closest match to ones of the segments. Thus, segment labeler 114 may produce an output having a sequence of tokens or labels corresponding to a sequence of segments in the processed speech.

Topic classifier 112 may be trained to recognize and classify on-topic and off-topic speech. Speech processing device 100 with a trained topic classifier 112 may receive speech, process the speech and classify the speech as being on topic, for example, speech about a topic of interest, such as baseball, or off-topic, for example, speech about anything other than baseball. As discussed in more detail below, topic classifier 112 can be employed as a language classifier.

Figure 2:
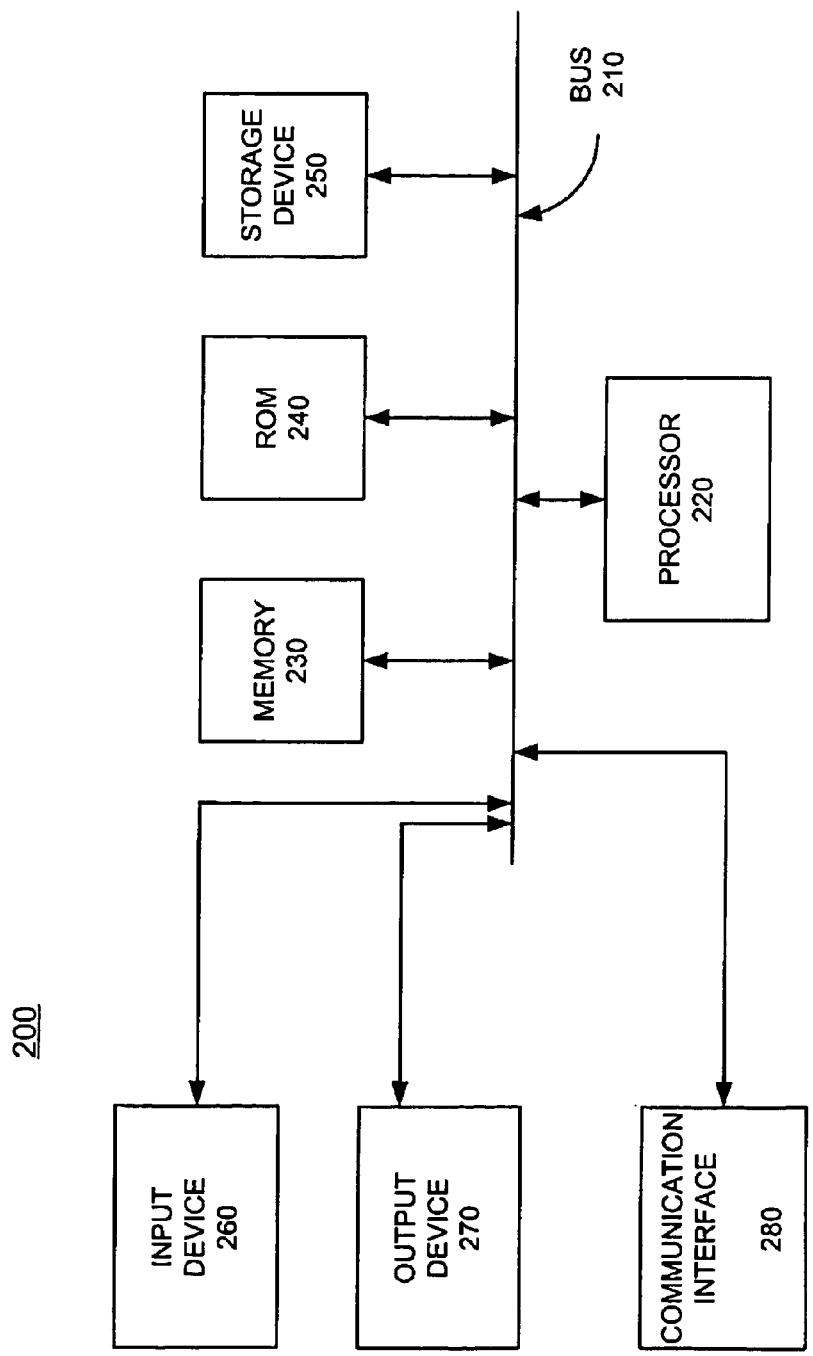
FIG. 2 illustrates an exemplary system within which a speech processing device consistent with the principles of the invention may be implemented.

FIG. 2 is a functional block diagram of an exemplary system 200 that may implement speech processing device 100 shown in the functional block diagram of FIG. 1. System 200 may include a bus 210, a processor 220, a memory 230, a read only memory (ROM) 240, a storage device 250, an input device 260, an output device 270, and a communication interface 280. The bus 210 may permit communication among the components of system 200.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive. Storage device 250 may include a database.

Input device 260 may include one or more conventional mechanisms that permit a user to input information to system 200, such as a keyboard, a mouse, a pen, a biometric mechanism, such as a voice recognition device, a microphone, etc. Output device 270 may include one or more conventional mechanisms that output information to the user, including a display, a printer, one or more speakers, etc. Communication interface 280 may include any transceiver-like mechanism that enables system 200 to communicate via a network. For example, communication interface 280 may include a modem or an Ethernet interface for communicating via a local area network (LAN). Alternatively, communication interface 280 may include other mechanisms for communicating with other devices and/or systems via wired, wireless or optical connections.

System 200 may perform such functions in response to processor 220 executing sequences of instructions contained in a computer-readable medium, such as memory 230. A computer-readable medium may include one or more memory devices and/or carrier waves. Such instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry may be used in place of or in combination with software instructions to implement the present invention. In still other implementations, various acts may be performed manually, without the use of system 200. Thus, the present invention is not limited to any specific combination of hardware circuitry and software.

Exemplary Acoustic Model Construction Process

Figure 3:
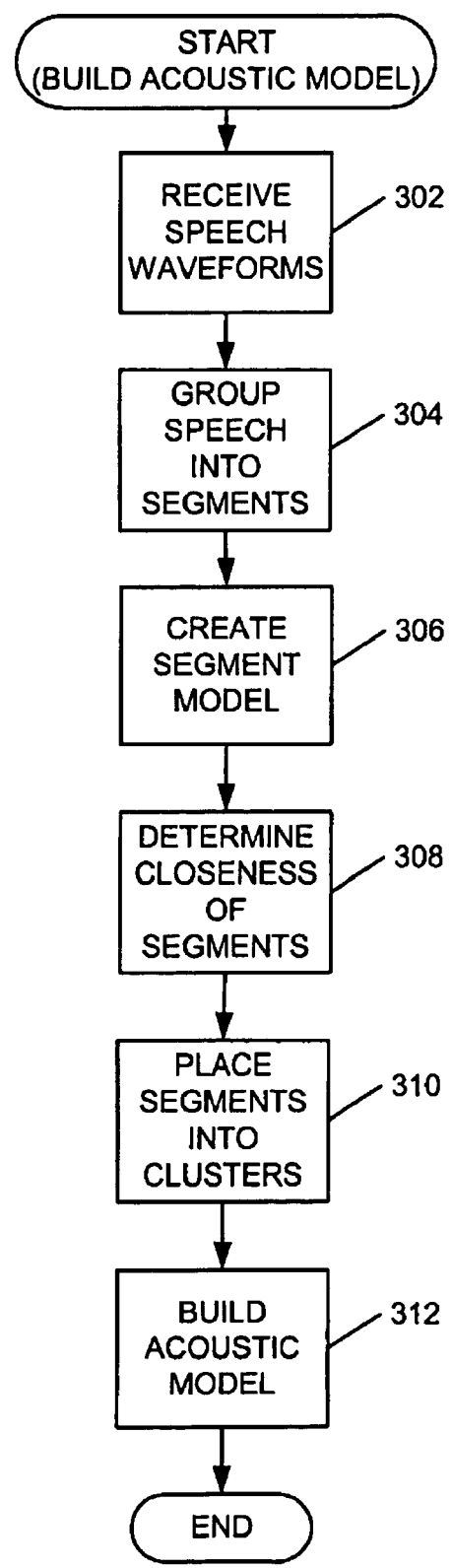
FIG. 3 is a flowchart that illustrates an exemplary process for constructing an acoustic model consistent with principles of the invention.

FIG. 3 is a flowchart that illustrates an exemplary process for constructing an acoustic model 110 that may be implemented by speech processing device 100, during a speech recognition training phase, consistent with principles of the invention. In one implementation of the invention, acoustic model 110 may include a Gaussian Mixture Model (GMM). One skilled in the art, however, will recognize that other models may be used. In this implementation of speech processing device 100, speech processing device 100 has no dictionary, no phonemes, and no other information concerning a language for recognition. The exemplary process may begin with the receipt of speech waveforms (act 302). The speech waveforms may be input from speech database 102 and may include speech from one or more speakers. The speech waveforms may include a group of speech frames. In one implementation, each speech frame may include 10 milliseconds of speech. Segmenter 104 of speech processing device 100 may group the input speech frames into a number of segments based on finding spectral discontinuities by analyzing spectral band energy of the speech frames or by any one of a number of well-known methods including, for example, methods of analyzing cepstral features of the speech frames.

Segment modeler 106 may analyze the segments and create a mathematical model of each segment (act 306). An m dimensional feature vector, such as a well-known cepstral feature vector, may represent a segment having a duration of N speech frames. Each dimension of the speech segment may be modeled according to the well-known formula:

$$c(n)=\mu(n)+e(n) \text{ for n}=1,\ldots,N \qquad \text{(Equation 1)}$$

where c(n) are observed cepstral features in a segment of length N, μ(n) is a mean feature vector as a function of speech frame number and represents the dynamics of features in the segment, and e(n) is a residual error term.

For a speech segment with a duration of N frames and each frame being represented by an m dimensional feature vector, the segment may be expressed in matrix notation as:

$$C = \begin{bmatrix} c_{1,1} & \cdots & c_{1,m} \\ c_{2,1} & \cdots & c_{2,m} \\ \vdots & & \\ c_{N,1} & \cdots & c_{N,m} \end{bmatrix} = [\underline{C}_1 \ldots \underline{C}_m] \qquad \text{(Equation 2)}$$

and may be modeled after equation 1 as:

$$C=ZB+E \qquad \text{(Equation 3)}$$

where Z is an N×R design matrix that indicates the type of model to use, B is a R×m trajectory parameter matrix and E is a residual error matrix. R is the number of parameters in the trajectory model. The trajectory parameter matrix, B, includes parameters of a polynomial that approximately fits the data.

From equation 3, each feature dimension i may be modeled as:

$$\underline{C}_i = Z\underline{B}_i + \underline{E}_i \text{ for } i=1, \ldots, m \quad \text{(Equation 4)}$$

Thus, from equation 4, for a quadratic trajectory model, a segment with N frames may be expressed as:

$$\begin{bmatrix} c_{1,i} \\ c_{2,i} \\ \vdots \\ c_{N,i} \end{bmatrix} = \begin{bmatrix} 1 & 0 & 0 \\ 1 & \frac{1}{N-1} & \left(\frac{1}{N-1}\right)^2 \\ \vdots & \vdots & \vdots \\ 1 & 1 & 1 \end{bmatrix} \begin{bmatrix} b_{1,i} \\ b_{2,i} \\ b_{3,i} \end{bmatrix} + \begin{bmatrix} e_{1,i} \\ e_{2,i} \\ \vdots \\ e_{N,i} \end{bmatrix} \quad \text{(Equation 5)}$$

$$\text{for } i = 1, \ldots, m$$

The matrix, $$\begin{bmatrix} b_{1,i} \\ b_{2,i} \\ b_{3,i} \end{bmatrix}$$

defines the parameters for each of the cepstral features. In equation 5, normalization is handled in design matrix Z.

Assuming that errors are independent and identically distributed, the Maximum Likelihood (ML) estimate, $\hat{B}_k$, of the trajectory parameter matrix may be given by the linear least squares estimate:

$$\hat{B}_k = [Z'_k Z_k]^{-1} Z'_k C_k \quad \text{(Equation 6)}$$

for a segment k with data matrix, $C_k$, and design matrix, $Z_k$.

With $\hat{B}_k$ estimated, the residual error covariance matrix, $\hat{\Sigma}_k$, for the segment may be given by:

$$\sum_k \hat{} = \frac{\hat{E}'_k \hat{E}_k}{N_k} = \frac{(C_k - Z_k \hat{B}_k)'(C_k - Z_k \hat{B}_k)}{N_k} \quad \text{(Equation 7)}$$

where $N_k$ is the number of frames in a segment, such as segment k. Subsequent analysis concerning a segment may be performed by using the segment's set of statistics: $\{\hat{B}_k, \hat{\Sigma}_k, N_k\}$.

Segment clusterer 108 may then compare segments to determine how closely the segments compare with one another (act 308). There are a number of existing techniques for comparing segments. In one implementation, segment clusterer 108 may calculate a distance between each combination of two segments. The following describes the distance calculation in more detail.

Consider the hypothesis that observations associated with two segments were generated by the same trajectory model (i.e., the segments are close in distance) and compare this to the alternative hypothesis that the two segments were not generated by the same trajectory model (i.e., the segments are not close in distance). The hypothesis forms the basis for a generalized likelihood ratio test and the negative of the log likelihood ratio can be used as the distance.

For example, given two speech segments, X (N1 frames long) and Y (N2 frames long), we have the following hypothesis test:

$H_0$: the segments were generated by the same trajectory model, and $H_1$: the segments were generated by different trajectory models, where $H_0$ is hypothesis 0 and $H_1$ is hypothesis 1.

If $\lambda$ denotes the likelihood ratio, then $$\lambda = \frac{L_0}{L_1} \quad \text{(Equation 8)}$$

where $L_0$ is the likelihood that the segments were generated by the same trajectory model and $L_1$ is the likelihood that the segments were generated by different trajectory models.

Let $\Sigma_k$ and $B_k$ be trajectory model parameters for segment k. Then the likelihood of a sequence of speech features (a segment) being generated by this model depends on the segment via the estimate of trajectory parameters, $\hat{B}$, the estimate of the covariance matrix, $\hat{\Sigma}$, and, N, the number of frames in the segment. Using a Gaussian model, the likelihood is given by:

$$L\left(\hat{B}, \hat{\Sigma} \mid B_k, \sum_k\right) = (2\pi)^{-\frac{mN}{2}} \left|\sum_k\right|^{-\frac{N}{2}} \cdot \quad \text{(Equation 9)}$$

$$\exp\left(-\frac{N}{2} tr\left[\sum_k^{-1} \hat{\Sigma}\right]\right) \cdot$$

$$\exp\left(-\frac{1}{2} tr\left[Z(\hat{B} - B_k) \sum_m^{-1} (\hat{B} - B_k)' Z'\right]\right)$$

where tr (trace) is the sum of diagonal elements of a matrix.

Equation 9 shows that the likelihood is not simply a function of the likelihoods for the trajectories of the individual features. The interaction between the trajectories for the individual features is caused by the contemporaneous correlation existing between the residuals associated with the different features.

Thus, equation 8 becomes:

$$\lambda = \frac{L_0}{L_1} = \frac{L(X; \hat{B}, \hat{\Sigma}) L(Y; \hat{B}, \hat{\Sigma})}{L(X; \hat{B}_1, \hat{\Sigma}_1) L(Y; \hat{B}_2, \hat{\Sigma}_2)} \quad \text{(Equation 10)}$$

Using Gaussian likelihood expressions in equation 9 for the trajectory models and simplifying, we have:

$$\lambda = \frac{|S_1|^{\frac{N_1}{2}} |S_2|^{\frac{N_2}{2}}}{|S|^{\frac{N}{2}}} \quad \text{(Equation 11)}$$

where $N = N_1 + N_2$, $S_1$ and $S_2$ are sample covariance matrices for segments X and Y, respectively, and S is a sample covariance matrix for a joint segment model of segments $S_1$ and $S_2$.

The sample covariance matrix for the sample joint segment model can be rewritten as a sum of two matrices as follows:

$$S = W + D \quad \text{(Equation 12)}$$

where $$W = \frac{N_1}{N}S_1 + \frac{N_2}{N}S_2 \quad \text{(Equation 13)}$$

and $$D = \frac{(Z_1\hat{B}_1 - Z_1\hat{B})'(Z_1\hat{B}_1 - Z_1\hat{B})}{N} + \frac{(Z_2\hat{B}_2 - Z_2\hat{B})'(Z_2\hat{B}_2 - Z_2\hat{B})}{N} \quad \text{(Equation 14)}$$

The W matrix is a weighted sum of the covariance matrices of the two separate segments X and Y, and the D matrix includes the deviations between the segment trajectories and the trajectory of the joint model.

From equation 12, the W matrix can be factored out to provide the following expression for the sample covariance of the joint matrix model and its determinant:

$$S = W(I + W^{-1}D) \quad \text{(Equation 15)}$$

where I is the identity matrix and $$|S| = |W||I + W^{-1}D| \quad \text{(Equation 16)}$$

Substituting equation 16 into equation 11, we have:

$$\lambda = \frac{|S_1|^{\frac{N_1}{2}}|S_2|^{\frac{N_2}{2}}}{|W|^{\frac{N}{2}}} \times \frac{1}{|I + W^{-1}D|^{\frac{N}{2}}} \quad \text{(Equation 17)}$$

which can be written as:

$$\lambda = \lambda_{COV}\lambda_{TRAJ} \quad \text{(Equation 18)}$$

where $$\lambda_{COV} = \frac{|S_1|^{\frac{N_1}{2}}|S_2|^{\frac{N_2}{2}}}{|W|^{\frac{N}{2}}} \quad \text{(Equation 19)}$$

and $$\lambda_{TRAJ} = \frac{1}{|I + W^{-1}D|^{\frac{N}{2}}} \quad \text{(Equation 20)}$$

From the above likelihoods, we obtain the "distances" between segments by taking the negative of their logarithms:

$$d_{COV} = -\log(\lambda_{COV}) = \frac{N}{2}\log|W| - \frac{N_1}{2}\log|S_1| - \frac{N_2}{2}\log|S_2| \quad \text{(Equation 21)}$$

and $$d_{TRAJ} = -\log(\lambda_{TRAJ}) = \frac{N}{2}\log|1 + W^{-1}D| \quad \text{(Equation 22)}$$

Since the generalized likelihood ratio is always greater than zero and less than unity, the above "distances" are always positive. In implementations consistent with the principles of the invention, $d_{TRAJ}$ is used as a distance measure. In other implementations, a combination, such as $d_{TRAJ} + d_{COV}$ may be used as the distance measure.

Segment clusterer 108 may create clusters from the segments, where a cluster is a group of segments (act 310). In an implementation of segment clusterer 108 consistent with the principles of the invention, segment clusterer 108 may create a dendrogram, which illustrates the segments and distances between segments.

Figure 4:
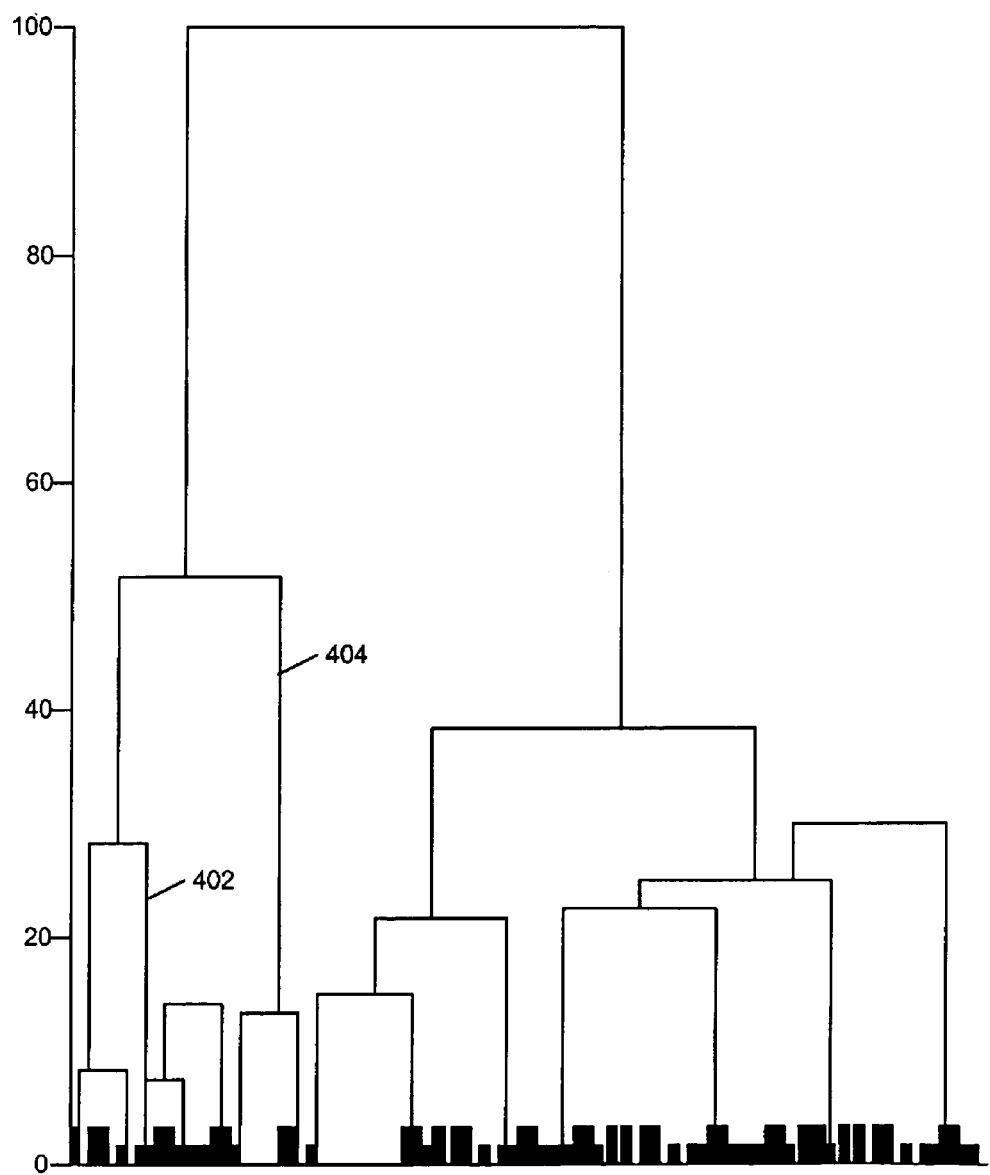
FIG. 4 illustrates an exemplary dendrogram.

FIG. 4 illustrates an exemplary dendrogram. The bottom of FIG. 4, along the horizontal axis, shows individual segments. Along the vertical axis, distances are shown. Reference numeral 402 points to two groups of segments having a distance of approximately 28. Reference numeral 404 shows two groups of clusters having a distance of about 49. By analyzing the dendrogram, a decision can be made on how the clustering should be performed. For example, if clusters should be at least a distance of 20 from one another, then segment clusterer 108 may create nine groups of clusters (note, by finding the distance 20 in FIG. 4 and moving across the figure horizontally, nine lines are intersected). In implementations consistent with the principles of the invention, generally segment clusterer 108 may cluster segments such that between fifty and two hundred clusters of segments are created. Alternatively, segment clusterer 108 may automatically determine numbers of clusters that would be created using different distances and may automatically set a distance for creating a number of segments, for example, between fifty and two hundred segments.

Segment clusterer 108 may create an acoustic model 110 from the clusters. In one implementation, for example, acoustic model 110 may include a GMM. A GMM may be created from clusters using existing techniques.

Classifier Training

Figure 5:
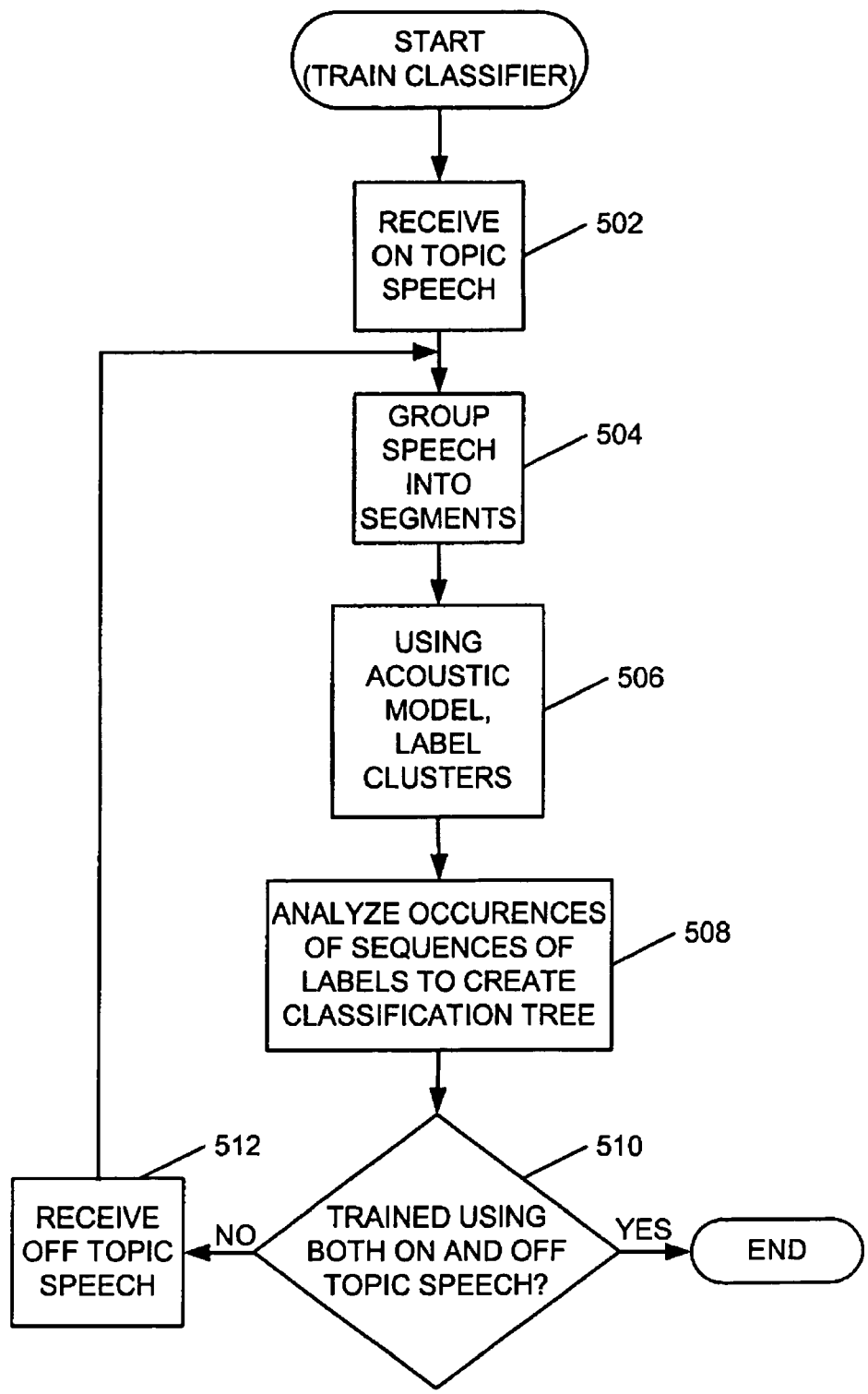
FIG. 5 is a flowchart that illustrates an exemplary process for training a topic classifier.

FIG. 5 is a flowchart that illustrates an exemplary process for training topic classifier 112 in an implementation consistent with the principles of the invention. Speech processing device 100 may begin by receiving speech that is on a particular topic, such as, for example, baseball (act 502). Segmenter 104 may group the received speech into segments (act 504), as previously described. Using the acoustic model (e.g., the GMM in one implementation) built during training, segment labeler 114 may determine which clusters most closely match a segment and may create a labeled output with a token indicating the particular matched cluster (act 506). Thus, segment labeler 114 may output a sequence of tokens or labels representing matched clusters. For example, segment labeler 114 may output a sequence, such as: P5.P27.P0.P32.P30 . . . , where each P(number) may represents a token or label corresponding to a particular matched cluster.

Speech processing device 100 may use well-known techniques, such as support vector machines, trees, or a combination of well-known techniques to analyze occurrences of sequences of labels and create a classification tree for topic classifier 112 (act 508). Use of the created classification tree is described with respect to FIG. 6 below. Speech processing device 100 may determine whether classifier training has been done with both on-topic speech, for example, speech concerning baseball, and off-topic speech, for example, speech on any topic other than baseball (act 510). If classifier training has not been done using both on-topic and off-topic speech, speech processing device 100 may receive off-topic speech (act 512) and repeat acts 504-510. Alternatively, topic classifier 112 may be trained with on-topic speech and without off-topic speech.

Exemplary Speech Classification Process

Figure 6:
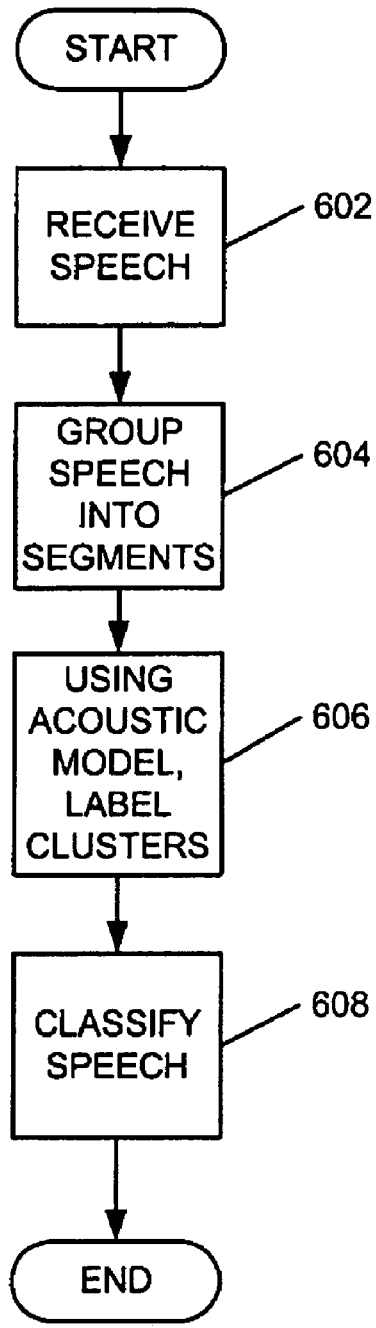
FIG. 6 is a flowchart that illustrates an exemplary process for using a trained speech processing device consistent with principles of the invention.

FIG. 6 is a flowchart that illustrates an exemplary speech classification process that may be implemented by speech processing device 100, consistent with the principles of the invention, subsequent to the exemplary classifier training process of FIG. 5. Speech processing device 100 may begin by receiving speech, including speech frames (act 602). Segmenter 104 may create segments from the received speech (act 604). Using the previously created acoustic model 110 (e.g., a GMM in one implementation), segment labeler 114 may determine which clusters most closely match the segments and outputting labels, where each of the labels corresponds to a most closely matched cluster (act 606). The result may be a sequence of tokens or labels, as discussed above. Trained topic classifier 112 may analyze the sequence of tokens or labels against classifier training results to classify the speech as either on or off topic (act 608).

Figure 7:
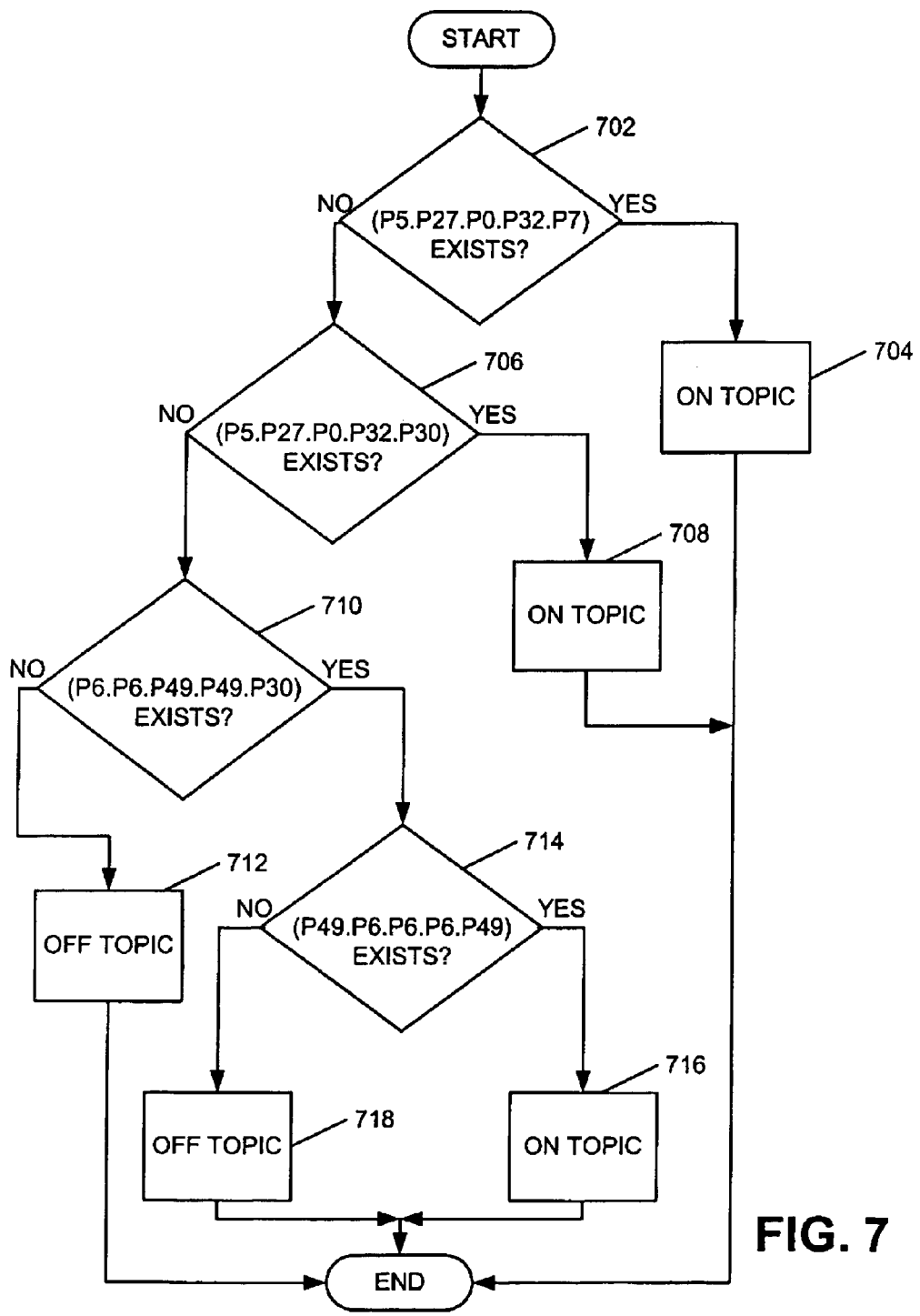
FIG. 7 illustrates an exemplary classification tree that may be built as a result of training a topic classifier consistent with the principles of the invention.

In one implementation consistent with the principles of the invention, classifier training may have created a classification tree. An exemplary classification tree is illustrated in FIG. 7. Topic classifier 112 may begin by determining whether a sequence of labels or tokens, such as (P5.P27.P0.P32.P7) exists in segment labeler's 114 labeled output (act 702). Each P(number) may correspond to a particular cluster. If the sequence exists, then topic classifier 112 may classify the speech as on topic (act 704). Otherwise, topic classifier 112 may determine whether a sequence, such as (P5.P27.P0.P32.P30) exists in segment labeler's 114 labeled output (act 706). If the sequence exists, then topic classifier 112 may classify the speech as on topic (act 708). Otherwise, topic classifier 112 may determine whether a sequence, such as (P6.P6.P49.P49.P30) exists in segment labeler's 114 labeled output (act 710). If the sequence doesn't exist, then topic classifier 112 may classify the speech as off topic (act 712). Otherwise, topic classifier 112 may determine whether a sequence, such as (P49.P6.P6.P6.P49) exists in segment labeler's 114 labeled output (act 714). If the sequence exists, then topic classifier 112 may classify the speech as on topic (act 716). Otherwise, topic classifier 114 may classify the speech as off topic (act 718).

Variations

Alternative Uses of Topic Classifier

Although, the above implementations describe a speech processing device that may be trained to recognize on and off topic speech, speech processing device 100 may be used in other ways. For example, speech processing device 100 may be used to classify a particular speaker's speech as on-topic speech by using only the speaker's speech to train speech processing device 100 to recognize only speech from the particular speaker as on-topic speech and using speech from other speakers to train speech processing device 100 to recognize speech from other speakers as off-topic speech. Similarly, speech processing device may be used as a language classifier to classify a particular language, such as French, as on-topic speech by using different languages to train the recognizer to recognize speech, using only French speech to train speech processing device 100 to recognize on-topic speech and using any other language or languages to train speech processing device 100 to recognize off-topic speech. Thus, one can accurately read this patent application with "language classifier" substituted for "topic classifier" in both specification and drawings, to view a particular language as "on topic" or "on language" speech and other languages as "off topic" or "off language" speech. In this manner, the speech processing device may be trained to recognize speech units in any ("on topic") language.

Grapheme-Lexeme Mapping

Grapheme-Lexeme mapping is a well-known technique which maps spoken speech to written language and vice versa. Grapheme-Lexeme mapping may be included in implementations consistent with the principles of the invention. In such implementations, Grapheme-Lexeme mapping may map sequences of chunks into written words and written words into sequences of segments. Thus, implementations of speech processing device 100, which include Grapheme-Lexeme mapping, may produce transcribed data. Further, in some implementations, text or transcribed data may be provided as input to speech processing device 100. For example, textual keywords may be provided as input to speech processing device 100, such that speech processing device 100 may find and classify as on-topic speech, for example, speech in speech database 102, that may include any combination of the keywords or all of the key words.

For example, when one or more textual keywords are input to speech processing device 100, a Grapheme-Lexeme mapper may convert the keywords into a sequence of labels or tokens corresponding to sequences of clusters that match the textual keywords. In one implementation consistent with the principles of the invention, the labels or tokens may be processed by topic classifier 112 to create a classification tree to be used for topic classification.

Language Models

In other implementations of speech processing device 100, consistent with principles of the invention, speech processing device may be modified to create a language model based on processed speech. For example, speech processing device 100 may use existing techniques to perform Ngram analysis on processed speech to develop probabilities of likely and unlikely sequences of segments. In implementations that also include a Grapheme-Lexeme mapper, speech processing device 100 may perform the Ngram analysis on textual data or processed speech to develop the probabilities. With knowledge of likely and unlikely sequences of segments, speech processing device 100 may process speech more accurately with fewer errors. Further, actual processing time may decrease because speech processing device 100 can eliminate checking for occurrences of certain segments once some of the sequence of segments occurring in the input are known.

Pseudo-Words

In implementations of speech processing device 100, consistent with the principles of the invention, language input, either in the form of speech or textual input (in implementations having a Grapheme-Lexeme mapper), may have occurring patterns of segments that may be observed by counting occurrences of sequences of segments. The sequences of segments may represent words or portions of words (i.e., pseudo-words). Thus, during speech processing, when speech processing device 100 detects at least a portion of a frequently occurring sequence of segments, speech processing device 100 may check whether segments following a partial portion of a frequently occurring sequence of segments are segments from the frequently occurring sequence. Thus, speech processing device 100 may become more accurate by first looking for frequently occurring sequences. In addition, speech processing device 100 may then process speech more quickly.

CONCLUSION

The foregoing description of exemplary embodiments of the present invention provides illustration and description, but is not intended to be exhaustive or to limit the invention to the precise form disclosed. Other modifications and variations are possible in light of the above teachings or may be acquired from practice of the invention. For example, while certain aspects have been described as implemented in hardware and others in software, other configurations may be possible.

While series of acts have been described with regard to FIGS. 3, 5, 6 and 7, the order of the acts is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A machine-implemented method comprising:
   training a speech processing device to recognize speech units in a plurality of languages, including:
   receiving a plurality of speech frames;
   grouping the speech frames into a plurality of segments;
      creating a model of each of the segments, including:
         estimating a trajectory parameter matrix for each of the segments, and
         calculating a residual error covariance matrix for each of the segments;
      comparing the segments;
      grouping the segments into a plurality of clusters based on the comparing; and
      building a model of the clusters.

2. The machine-implemented method of claim 1, further comprising:
   receiving a second plurality of speech frames;
   grouping the second plurality of speech frames into a second plurality of segments;
   comparing the second plurality of segments to the model of the clusters;
   creating a sequence of labels representing a sequence of clusters, each of the labels representing a cluster that most closely matches a corresponding one of the second plurality of segments; and
   classifying the second plurality of speech frames as on-topic speech or off-topic speech based on the sequence of labels.

3. The machine-implemented method of claim 1, wherein the grouping the speech frames into a plurality of segments comprises:
   analyzing a spectral band of energy of the speech frames; and
   grouping the speech frames into the plurality of segments based on the analyzing.

4. The machine implemented method of claim 1, wherein the comparing the segments comprises:
   calculating distances between each of the segments.

5. The machine implemented method of claim 4, wherein the calculating the distances between each of the segments comprises:
   calculating a distance, $d_{cov}$, according to $$d_{COV} = -\log(\lambda_{COV}) = \frac{N}{2}\log|W| - \frac{N_1}{2}\log|S_1| - \frac{N_2}{2}\log|S_2|,$$

where $S_1$ is a sample covariance matrix for a first segment, $S_2$ is a sample covariance matrix for a second segment, $N_1$ is a length of the first segment in speech frames, $N_2$ is a length of the second segment in speech frames, N is a sum of $N_1$ and $N_2$ and $$W = \frac{N_1}{N}S_1 + \frac{N_2}{N}S_2.$$

6. The machine implemented method of claim 4, wherein the calculating the distances between each of the segments comprises:
   calculating a distance, $d_{cov}+d_{traj}$, according to $$d_{COV} = -\log(\lambda_{COV}) = \frac{N}{2}\log|W| - \frac{N_1}{2}\log|S_1| - \frac{N_2}{2}\log|S_2|,$$

where $S_1$ is a sample covariance matrix for a first segment, $S_2$ is a sample covariance matrix for a second segment, $N_1$ is a length of the first segment in speech frames, $N_2$ is a length of the second segment in speech frames, N is a sum of $N_1$ and $N_2$ $$W = \frac{N_1}{N}S_1 + \frac{N_2}{N}S_2,$$

and $$d_{TRAJ} = -\log(\lambda_{TRAJ}) = \frac{N}{2}\log|I + W^{-1}D|,$$

where I is an identity matrix, $$D = \frac{(Z_1\hat{B}_1 - Z_1\hat{B})'(Z_1\hat{B}_1 - Z_1\hat{B})}{N} + \frac{(Z_2\hat{B}_2 - Z_2\hat{B})'(Z_2\hat{B}_2 - Z_2\hat{B})}{N},$$

$Z_1$ and $Z_2$ are design matrices of the first segment and the second segment, respectively, and $\hat{B}$, $\hat{B}_1$ and $\hat{B}_2$ are estimates of the trajectory parameters of a joint segment model, the first segment and the second segment, respectively.

7. The machine-implemented method of claim 4, wherein the grouping of the segments into a plurality of clusters based on the comparing comprises:
   determining a distance between the segments such that a number of clusters to be created is between 50 and 200, inclusive; and
   grouping the segments into the plurality of clusters based on the distances between each of the segments.

8. The machine-implemented method of claim 1, wherein the building a model of the clusters comprises:
   building a Gaussian Mixture Model, wherein each term of the Gaussian Mixture Model initially represents a different one of the clusters.

9. The machine-implemented method of claim 1, further comprising:
   analyzing groups of segments from training input, determining frequencies of occurrence of patterns of labels representing the training input and developing probabilities that a next label in a partial sequence of labels is one or more particular labels, wherein the training input is derived from speech input or text input.

10. The machine-implemented method of claim 1, further comprising:
    analyzing training data to determine an existence of occurring patterns of acoustic events; and
    using the determined occurring patterns of acoustic events to identify any of the occurring patterns of acoustic events in input after the training, wherein
    the input after the training is derived from speech input or textual input.

11. A machine-implemented method comprising:
    training a speech processing device to recognize speech units in a plurality of languages; and
    training a topic classifier to distinguish between on-topic and off-topic speech, including:
    receiving on-topic speech frames;
    grouping the on-topic speech frames into segments;
    matching each of the segments to a cluster of a plurality of clusters;
    creating sequences of labels based on the matching, each label representing one of the clusters; and
    analyzing the sequences of labels based on the matching each of the segments of on-topic speech to determine sequences of labels that appear in on-topic speech.

12. The machine-implemented method of claim 11, further comprising:
    receiving off-topic speech frames;
    grouping the off-topic speech flames into segments;
    repeating the matching each of the segments to a cluster and the creating sequences of labels based on the matching; and
    analyzing the sequences of labels based on the matching each of the segments of off-topic speech to determine sequences of labels that appear in off-topic speech.

13. The machine-implemented method of claim 11, wherein the matching each of the segments comprises:
    using a Gaussian Mixture Model created during the training of the speech processing device to match each of the segments of the on-topic speech frames or the off-topic speech frames to a cluster.

14. The machine-implemented method of claim 11, wherein the training a topic classifier to distinguish between on-topic speech and off-topic speech further comprises:
    receiving textual language input;
    mapping the textual language input to a sequence of segments; and
    analyzing the sequence of segments to determine sequences of segments that appear in on-topic speech.

15. The machine-implemented method of claim 11 further comprising:
    receiving at least one textual keyword;
    mapping the at least one textual keyword to at least one sequence of segments;
    receiving speech input;
    classifying the speech input as being on-topic when one or more sequences of segments corresponding to any combination of the keywords appearing in the speech input are determined to exist.

16. An apparatus comprising:
    a memory including a plurality of instructions; and
    a processor configured to execute the plurality of instructions to train the apparatus to recognize speech of a plurality of languages, including:
    receiving waveforms of speech, the waveforms including a plurality of speech frames;
    grouping the plurality of speech frames into a plurality of segments;
    creating a model of each of the segments, including
       estimating a trajectory parameter matrix for each of the segments, and
       calculating a residual error covariance matrix for each of the segments;
    determining differences among the segments;
    grouping the segments into a plurality of clusters based on the differences among the segments; and
    building an acoustic model of the clusters.

17. The apparatus of claim 16, wherein the processor is further configured to execute the plurality of instructions to:
    receive second waveforms of speech including a second plurality of speech frames;
    group the second plurality of speech frames into a second plurality of segments; and
    use the acoustic model to find a best matching cluster for each of the second plurality of segments.

18. The apparatus of claim 17, wherein the processor is further configured to execute the plurality of instructions to:
    classify the second plurality of speech frames as on-topic speech or off-topic speech based on a sequence of clusters that best match a sequence of the second plurality of segments.

19. The apparatus of claim 16, wherein the processor is configured to group the plurality of speech frames into segments by:
    analyzing a spectral band of energy of the speech frames; and
    determining where one segment ends and another segment begins based on the analyzing.

20. The apparatus of claim 16, wherein the processor is configured to determine differences among the segments by calculating distances between the segments.

21. The apparatus of claim 20, wherein the processor is configured to calculate distances between the segments by:
    calculating a distance, $d_{cov}$, according to $$d_{COV} = -\log(\lambda_{COV}) = \frac{N}{2}\log|W| - \frac{N_1}{2}\log|S_1| - \frac{N_2}{2}\log|S_2|,$$

where $S_1$ is a sample covariance matrix for a first segment, $S_2$ is a sample covariance matrix for a second segment, $N_1$ is a length of the first segment in speech frames, $N_2$ is a length of the second segment in speech frames, N is a sum of $N_1$ and $N_2$ and $$W = \frac{N_1}{N} S_1 + \frac{N_2}{N} S_2.$$

22. The apparatus of claim 20, wherein the processor is configured to group the segments into a plurality of clusters based on the differences among the segments by:
   determining a desired distance between the segments such that a number of clusters in a desired number range will be created; and
   grouping the segments into the plurality of clusters based on the desired distance determined.

23. The apparatus of claim 16, wherein the processor is configured to build an acoustic model by:
   building a Gaussian Mixture Model including a plurality of terms, each of the plurality of terms initially representing a different one of the clusters.

24. The apparatus of claim 16, wherein the processor is further configured to execute the plurality of instructions to:
   analyze groups of segments from training input, determine frequencies of occurrence of patterns of labels representing the training input and develop probabilities that a next label in a partial sequence of labels is one or more particular labels, wherein the training input is derived from speech input or text input.

25. The apparatus of claim 16, wherein the processor is further configured to execute the plurality of instructions to:
   analyze training data to determine an existence of occurring patterns of acoustic events; and
   using the determined occurring patterns of acoustic events to identify any of the occurring patterns of acoustic events in input after the training, wherein
   the input after the training is derived from speech input or textual input.

26. An apparatus comprising:
   a memory including a plurality of instructions; and
   a processor configured to execute the plurality of instructions to:
   train the apparatus to recognize speech of a plurality of languages, and
   train the apparatus to distinguish between on-topic and off-topic speech, including:
      receiving on-topic speech frames;
      grouping the speech frames into a plurality of segments;
      finding a best match for each of the segments from among a plurality of clusters;
      determining a sequence of the clusters corresponding to a sequence of the segments; and
      analyzing the sequence of clusters based on the finding a best match for each of the segments of on-topic speech to determine sequences of clusters that appear in on-topic speech.

27. The apparatus of claim 26, wherein the processor is further configured to train the apparatus to distinguish between on-topic and off-topic speech by:
   receiving off-topic speech frames;
   grouping the off-topic speech frames into segments;
   repeating the finding a best match and the determining a sequence of clusters; and
   analyzing the sequence of clusters based on the finding a best match for each of the segments of off-topic speech to determine sequences of clusters that appear in off-topic speech.

28. The apparatus claim 26, wherein the processor being configured to train the apparatus to distinguish between on-topic speech and off-topic speech being configured to:
   receive textual language input;
   map the textual language input to a sequence of labels representing a sequence of clusters; and
   analyze the sequence of labels to determine sequences of clusters that appear in on-topic speech.

29. The apparatus of claim 26 wherein the processor is further configured to execute the plurality of instructions to:
   receive at least one textual keyword;
   map the at least one textual keyword to at least one sequence of clusters;
   receive speech input;
   classify the speech input as being on-topic when one or more sequences of clusters corresponding to any combination of the keywords appearing in the speech input are determined to exist.

30. A machine-readable medium including a plurality of instructions for controlling at least one processor to perform a method of processing speech, the method comprising:
   training a speech processing device to recognize speech of a plurality of languages, including:
      receiving a plurality of speech frames;
      grouping the plurality of speech frames into a plurality of segments;
      creating a model of each of the segments, including
         estimating a trajectory parameter matrix for each of the segments, and
         calculating a residual error covariance matrix for each of the segments;
      determining differences among the segments;
      grouping the segments into a plurality of clusters based on the differences; and
   building an acoustic model of the clusters.

31. The machine-readable medium of claim 30, wherein the method further comprises:
   receiving a second plurality of speech frames;
   grouping the second plurality of speech frames into a second plurality of segments;
   using the acoustic model to find a best matching cluster for each of the second plurality of segments; and
   classifying the second plurality of speech frames as on-topic speech or off-topic speech based on a sequence of clusters that best match a sequence of the second plurality of segments.

32. The machine-readable medium of claim 30, wherein grouping the plurality of speech frames into a plurality of segments further comprises:
   analyzing a spectral band of energy of the speech frames to determine where one segment ends and another segment begins; and
   grouping the plurality of speech frames into the plurality of segments based on results of the analyzing a spectral band of energy.

33. The machine-readable medium of claim 30, wherein the determining differences among the segments further comprises:
   calculating a distance between each of the segments.

34. The machine-readable medium of claim 30, wherein grouping the segments into a plurality of clusters further comprises:

determining a desired distance between the segments such that a number of clusters in a desired number range will be created; and grouping the segments into the plurality of clusters based on the desired distance determined.

35. The machine-readable medium of claim 30, wherein the acoustic model is a Gaussian Mixture model.

36. The machine-readable medium of claim 30, wherein the method further comprises:

analyzing groups of segments from training input, determining frequencies of occurrence of patterns of labels representing the training input and developing probabilities that a next label in a partial sequence of labels is one or more particular labels, wherein the training input is derived from speech input or text input.

37. The machine-readable medium of claim 30, further comprising:

analyzing training data to determine an existence of occurring patterns of acoustic events; and using the determined occurring patterns of acoustic events to identify any of the occurring patterns of acoustic events in input after the training, wherein the input after the training is derived from speech input or textual input.

38. A machine-readable medium including a plurality of instructions for controlling at least one processor to perform a method of processing speech, the method comprising:

training a speech processing device to recognize speech of a plurality of languages; and training the speech processing device to distinguish between on-topic speech and off-topic speech, including:

receiving ones of on-topic speech frames;

grouping the speech frames into segments;

finding a best match for each of the segments from among a plurality of clusters;

determining a sequence of the clusters corresponding to a sequence of the segments; and determining ones of the sequences of the clusters that appear in the on-topic speech.

39. The machine-readable medium of claim 38, wherein the training the speech processing device to distinguish between on-topic speech and off-topic speech further comprises:

receiving textual language input;

mapping the textual language input to a sequence of labels representing a sequence of clusters; and analyzing the sequence of labels to determine sequences of clusters that appear in on-topic speech.

40. The machine-readable medium of claim 38, wherein the method further comprises:

receiving at least one textual keyword;

mapping the at least one textual keyword to at least one sequence of labels representing a sequence of clusters;

receiving speech input;

classifying the speech input as being on-topic when one or more sequences of labels, corresponding to any combination of the keywords, correspond to one or more sequences clusters of the speech input.

* * * * *